United States Patent
Wadsworth et al.

(10) Patent No.: US 10,598,127 B2
(45) Date of Patent: Mar. 24, 2020

(54) METHOD OF FABRICATING A THRUST REVERSER CASCADE ASSEMBLY

(71) Applicant: Spirit AeroSystems, Inc., Wichita, KS (US)

(72) Inventors: Mark Anthony Wadsworth, Sedan, KS (US); Henry Arnold Schaefer, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 169 days.

(21) Appl. No.: 15/677,642

(22) Filed: Aug. 15, 2017

(65) Prior Publication Data

US 2019/0055900 A1    Feb. 21, 2019

(51) Int. Cl.
*F02K 1/54* (2006.01)
*F02K 1/72* (2006.01)
*F02K 1/60* (2006.01)

(52) U.S. Cl.
CPC ................ *F02K 1/54* (2013.01); *F02K 1/605* (2013.01); *F02K 1/72* (2013.01); *F05D 2230/50* (2013.01); *F05D 2240/129* (2013.01)

(58) Field of Classification Search
CPC ......... F02K 1/54; F02K 1/56; F05D 2240/129
See application file for complete search history.

(56) References Cited

U.S. PATENT DOCUMENTS

| | | | |
|---|---|---|---|
| 3,024,604 A * | 3/1962 | Morley | F02K 1/56 239/265.29 |
| 3,076,309 A * | 2/1963 | Colley | F02K 1/56 239/265.29 |
| 3,794,246 A * | 2/1974 | Weise | F02K 1/56 239/265.33 |
| 4,778,110 A * | 10/1988 | Sankey | F02K 1/605 239/265.29 |
| 4,852,805 A * | 8/1989 | Vermilye | B29C 45/14631 239/265.11 |
| 5,152,860 A * | 10/1992 | Grossman | B29C 33/505 156/161 |
| 6,725,541 B1 * | 4/2004 | Holme | F02K 1/54 29/889.2 |
| 8,583,271 B2 * | 11/2013 | Engelbart | G05B 19/41875 219/121.67 |
| 9,410,502 B2 * | 8/2016 | Vauchel | F02K 3/025 |
| 9,527,238 B2 * | 12/2016 | Kruckenberg | B29C 66/301 |
| 9,771,894 B2 * | 9/2017 | Aten | F02K 1/72 |
| 9,895,840 B2 * | 2/2018 | Bartel | B29C 70/342 |
| 2012/0272637 A1 * | 11/2012 | Holland | B29C 63/34 60/226.2 |
| 2016/0263820 A1 * | 9/2016 | Kruckenberg | B29C 66/301 |
| 2017/0057166 A1 * | 3/2017 | Soria | F02K 1/56 |
| 2018/0340492 A1 * | 11/2018 | Harpal | F02K 1/54 |

* cited by examiner

*Primary Examiner* — Jacob J Cigna
*Assistant Examiner* — Michael W Hotchkiss
(74) *Attorney, Agent, or Firm* — Hovey Williams LLP (57) ABSTRACT

A method of fabricating a thrust reverser cascade assembly including positioning a first frame section on an assembly fixture, positioning a first set of turning vanes on a first elongated stiffener of the first frame section, securing the first set of turning vanes to the elongated stiffener, positioning a second frame section on the assembly fixture adjacent to the first frame section such that the first set of turning vanes are between the elongated stiffeners of the first and second frame section, adding additional sets of turning vanes and frame sections, and fastening the frame sections together.

20 Claims, 6 Drawing Sheets

METHOD OF FABRICATING A THRUST REVERSER CASCADE ASSEMBLY

BACKGROUND

Aircraft jet engines typically include thrust reversers to aid in stopping the aircraft during landing. Translating sleeve thrust reversers include a number of thrust reverser cascades having rows of structural frame sections (also known as "strongbacks") and turning vanes positioned between the frame sections for redirecting engine thrust. Thrust reverser cascades are often formed as monolithic composite parts via a labor intensive composite lay-up procedure. Such parts readily meet weight and quality requirements but are not easily adapted to innovative aerodynamic features. Thrust reverser cascades may also be formed from cast metal, but metal cascades are significantly heavier than composite cascades.

Prior art attempts to fabricate complex thrust reverser cascades of composite materials have been largely ineffective. For example, U.S. Pat. No. 5,507,143 discloses injection molded vane modules that fit into a grid of frame sections thus forming an array of repeating modules. However, the complicated interface geometries and the number of interfaces between the frame sections and the repeating modules results in excessive blockage. U.S. Pat. No. 4,852,805 discloses a thrust reverser cascade that includes injection molding over a metallic frame, which eliminates the need for handling a number of turning vanes. However, over-molding metal with thermoplastics can result in substantial thermal stresses. Other thrust reverser cascade assemblies, such as the one disclosed in U.S. Pat. No. 9,758,582, are formed by sliding turning vanes into place in a one-piece frame. Unfortunately, considerable care must be taken during this assembly process to avoid displacing adhesive paste from the mating surfaces of the turning vanes, which could result in reduced and inconsistent bonding between the turning vanes and the one-piece frame. One-piece frames also requires complicated tooling that must be extracted from the free end of the one-piece frame. Furthermore, steel tooling cannot be used to form one-piece frames because a large difference in Coefficients of Thermal Expansion (CTE) between the tooling and the one-piece frames is required for extracting the tooling from the one-piece frames. The geometry of one-piece frames prevents or hinders non-destructive inspection (NDI) and post-cure machining of various features of one-piece frames, and the overall width of one-piece frames cannot easily be increased.

SUMMARY

Embodiments of the present invention provide a method of fabricating a thrust reverser cascade assembly that facilitates NDI and post-cure machining of various features of the assembly. The method also allows for improved bonding between parts of the assembly and allows for the use of steel tooling during part formation.

In one embodiment, frame sections are first formed via a continuous process such as pultrusion or extrusion, a batch process, or any other suitable process. Steel tooling may be used since it can be extracted easily and hence a large difference in coefficient of thermal expansion (CTE) is not necessary. The frame sections are then trimmed or modified to a final dimension or shape. Holes or other strength-to-weight ratio modifications may also be drilled or cut in elongated stiffeners of the frame sections.

Turning vanes are then formed via a continuous process such as pultrusion or extrusion, a batch process, or any other suitable process. The turning vanes are also trimmed or modified to a final dimension or shape.

The frame sections and turning vanes are then individually examined via non-destructive inspection (NDI) before being assembled. For example, the frame sections and turning vanes may be interrogated via ultrasonic or eddy current probes.

A bonding agent is then coated on or applied to one or more of first and second sides of the elongated stiffeners, frame section flanges, and outer surfaces of vane flanges. This improves bonding between adjacent frame sections and between the elongated stiffeners and turning vanes.

A first frame section is then positioned on an assembly fixture. For example, alignment geometries of the first frame section may be aligned with a first set of alignment features of the assembly fixture.

An adhesive, double-sided tape, or similar agent (separate from the bonding agent) is then applied to outer surfaces of the vane flanges of a first set of turning vanes and flanges of the first frame section. The bonding agent helps the adhesive or tape adhere to the outer surfaces of the vane flanges of the first set of turning vanes and the elongated stiffeners and flanges of the frame sections.

The first set of turning vanes is then positioned on the elongated stiffener of the first frame section. The adhesive or tape applied to the outer surfaces holds the first set of turning vanes in place. The first set of turning vanes may also be aligned in a desired orientation via interlocking vane-to-vane and/or vane-to-frame geometry, welding, or fastening.

A second frame section is then positioned on the assembly fixture such that alignment geometries of the second frame section are aligned with a second set of alignment features of the assembly fixture and the flanges of the second frame section overlap or underlap the flanges of the first frame section. In this way, the first set of turning vanes are positioned between the elongated stiffeners of the first and second frame sections. That is, the elongated stiffener of the second frame section is spaced from the elongated stiffener of the first frame section and the first side of the elongated stiffener of the second frame section abuts outer surfaces of the second vane flanges of the first set of turning vanes. Arched geometry of the elongated stiffeners may also trap the turning vanes in place. The adhesive or tape applied to the flanges of the first frame section keep the overlapping flanges of the adjacent frame sections abutting each other.

An adhesive, double-sided tape, or similar agent is then applied to the outer surfaces of the vane flanges of a second set of turning vanes and the flanges of the second frame section. The bonding agent helps the adhesive or tape adhere to the outer surfaces of the vane flanges of the second set of turning vanes.

The second set of turning vanes is then positioned on the elongated stiffener of the second section. The adhesive or tape applied to the outer surfaces holds the second set of turning vanes in place. The second set of turning vanes is also aligned in a desired orientation via interlocking vane-to-vane and/or vane-to-frame geometry, welding, or fastening.

Additional intermediate frame sections and sets of turning vanes are then prepared and added to the thrust reverser cascade assembly as required. The end frame section is added last. Note that the flanges of the end frame section only extend towards the previously attached frame section. Thus, a complete thrust reverser cascade assembly includes opposing end frame sections and a number of intermediate frame sections. Fasteners are then inserted through the alignment geometries of the frame sections so as to secure the frame sections together and to attach the thrust reverser cascade assembly to a thrust reverser structure.

The above-described method and other embodiments of the invention provide many advantages. For example, forming each frame section separately allows steel tooling to be used since the tooling can be extracted easily from individual frame sections. Hence, tooling with a large difference in CTE is not necessary. Forming each frame section and turning vane separately also allows for easier application of a bonding agent between the frame sections and turning vanes, improved post-cure machining, and non-destructive inspection of each component. Material can also be removed from each frame section to improve its strength to weight ratio. Moreover, the turning vanes may be inserted into position without being slid into place, which eliminates the problem of paste adhesive being scraped off during installation and allows double-sided tape to be used to hold the turning vanes in place. Other advantages include gravity assisting in maintaining the stability of turning vane during assembly, and fasteners inserted into alignment geometries of overlapping flanges of adjacent frame sections secure the adjacent frame sections together and secure the thrust reverser cascade assembly to a thrust reverser structure. The thrust reverser cascade assembly can also be extended laterally by adding additional frame sections and additional turning vanes, which can increase strength and reduce overall weight of the thrust reverser.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIGS. 1-6, a method of fabricating a thrust reverser cascade assembly 10 in accordance with an embodiment of the invention is illustrated. First, a plurality of frame sections 12*a-e* may be formed via a continuous process such as pultrusion or extrusion, a batch process, or any other suitable process, as shown in block 100 of FIG. 6. Steel tooling may be used since it can be extracted easily and hence a large difference in coefficient of thermal expansion (CTE) is not necessary.

Figure 1:
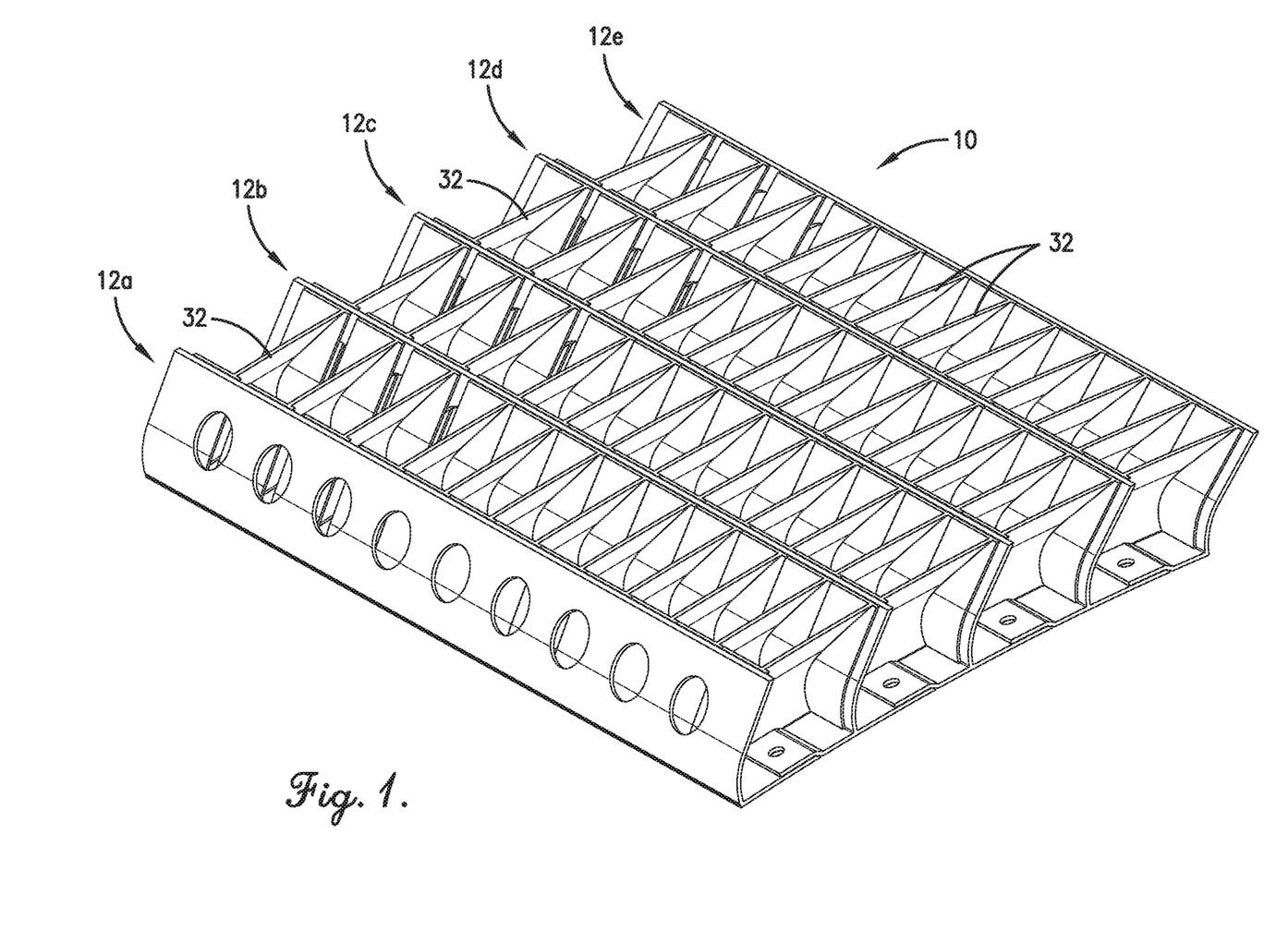
FIG. 1 is a perspective view of a thrust reverser cascade assembly constructed in accordance with an embodiment of the present invention.
Figure 2:
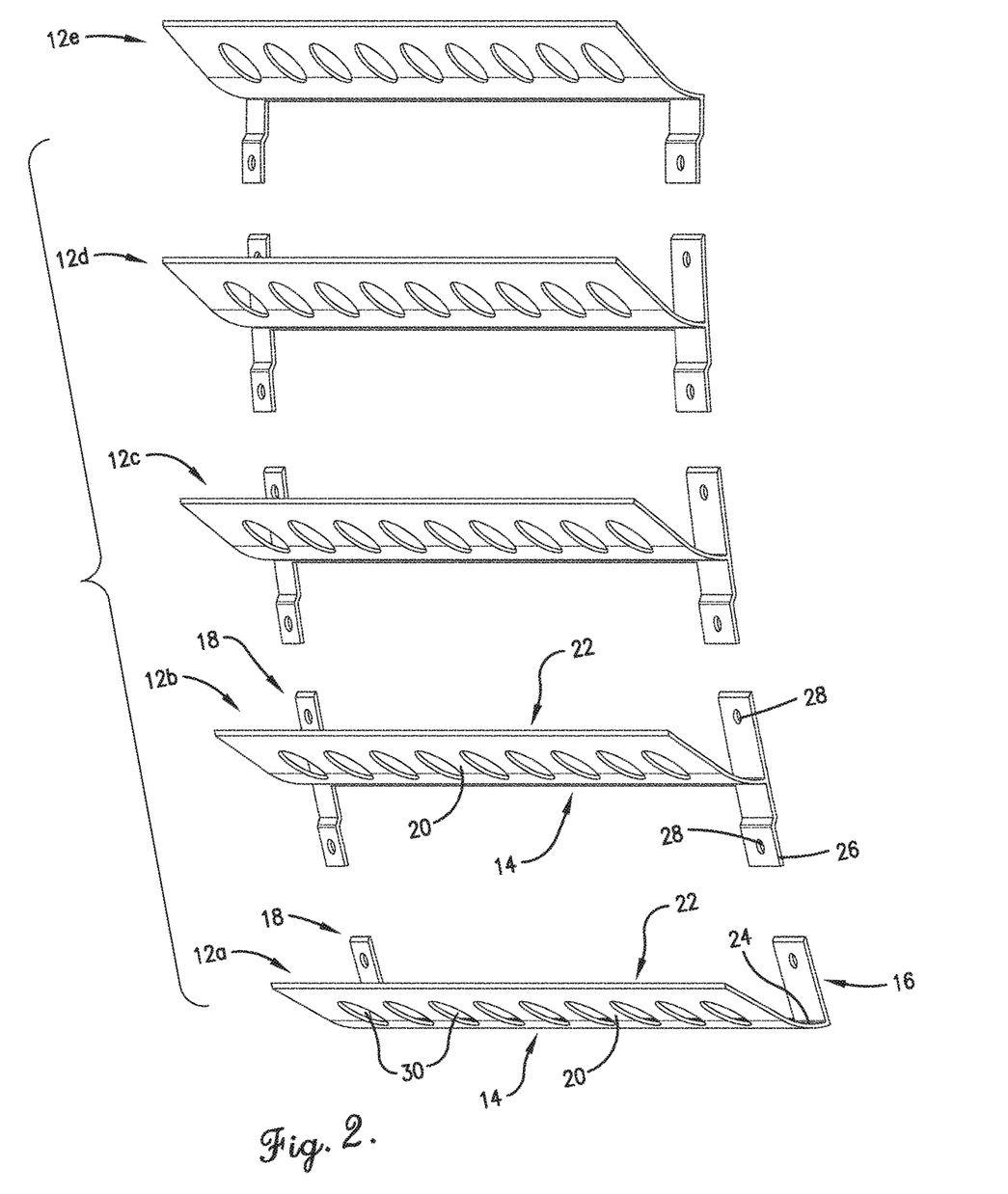
FIG. 2 is an exploded perspective view of frame sections of the thrust reverser cascade assembly.

The frame sections 12*a-e* each include an elongated stiffener 14 and first and second flanges 16, 18. The elongated stiffener 14 is a generally flat or arched louver or slat having opposing first and second sides 20, 22. The elongated stiffener 14 may also have slots, ridges, or other turning vane alignment geometries 24. Flanges 16, 18 of the first end frame section 12*a* extend from only the second side 22 of its elongated stiffener 14 and flanges 16, 18 of the second end frame section 12*e* extend from only the first side 20 of its elongated stiffener 14, while flanges 16, 18 of intermediate frame sections 12*b-d* extend from both sides 20, 22 of their elongated stiffeners 14. One end of each flange 16, 18 may have a stepped or offset portion 26 for overlapping a flange of an adjacent frame section. Each flange 16, 18 may also have one or more openings or other similar alignment geometry 28 for positioning the frame section 12*a-e* on an assembly fixture 200. The alignment geometry 28 may also be configured to receive an alignment and/or securement fastener therethrough.

Figure 6:
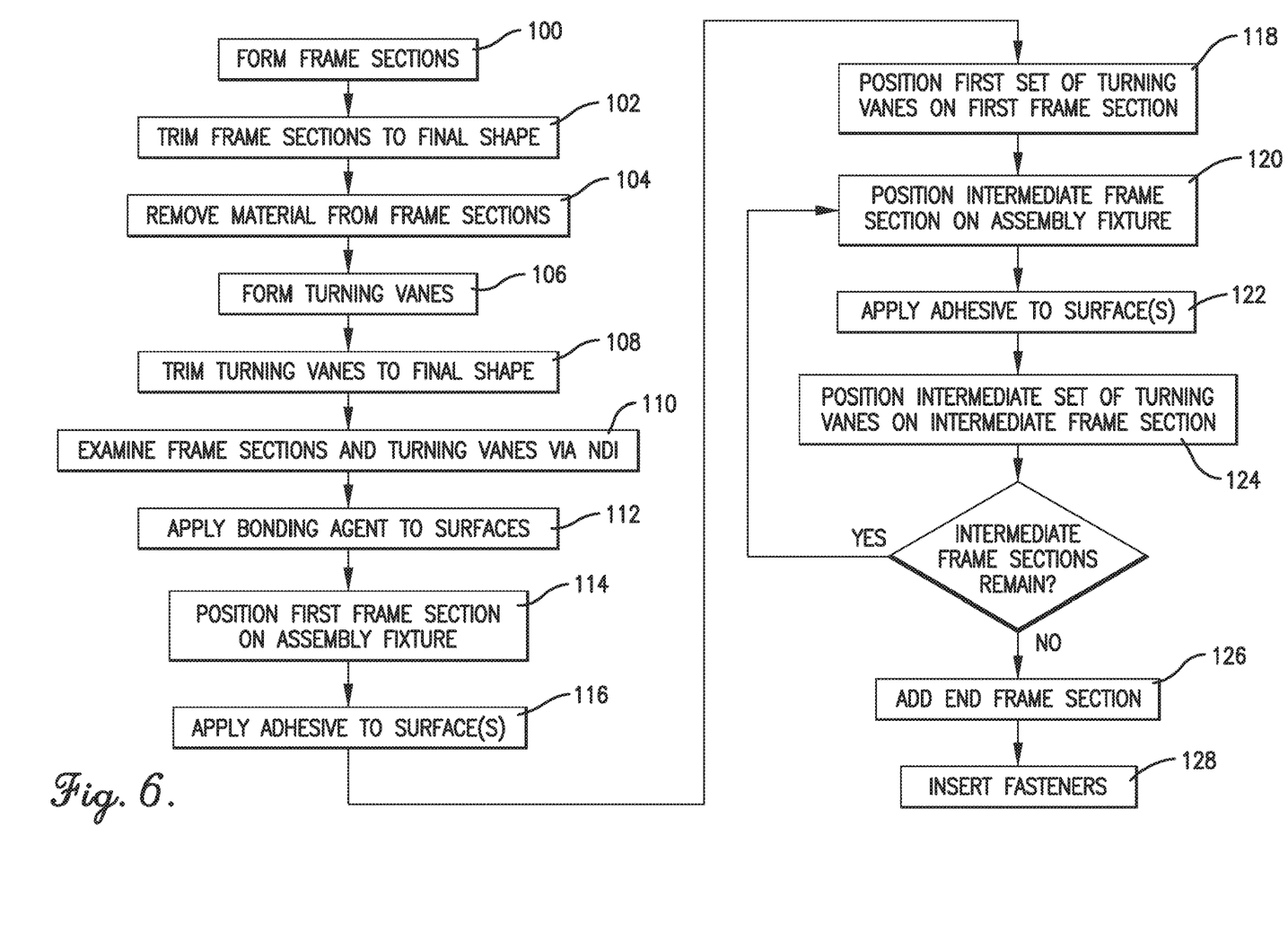
FIG. 6 is a flow chart depicting exemplary steps in a method of fabricating a thrust reverser cascade assembly in accordance with an embodiment of the present invention.

The frame sections 12*a-e* may then be trimmed or modified to a final dimension or shape, as shown in block 102. Holes 30 or other strength-to-weight ratio modifications may also be drilled or cut in the elongated stiffeners 14, as shown in block 104. The holes 30 may also double as vane spacing and/or alignment features.

Figures 3, 4:
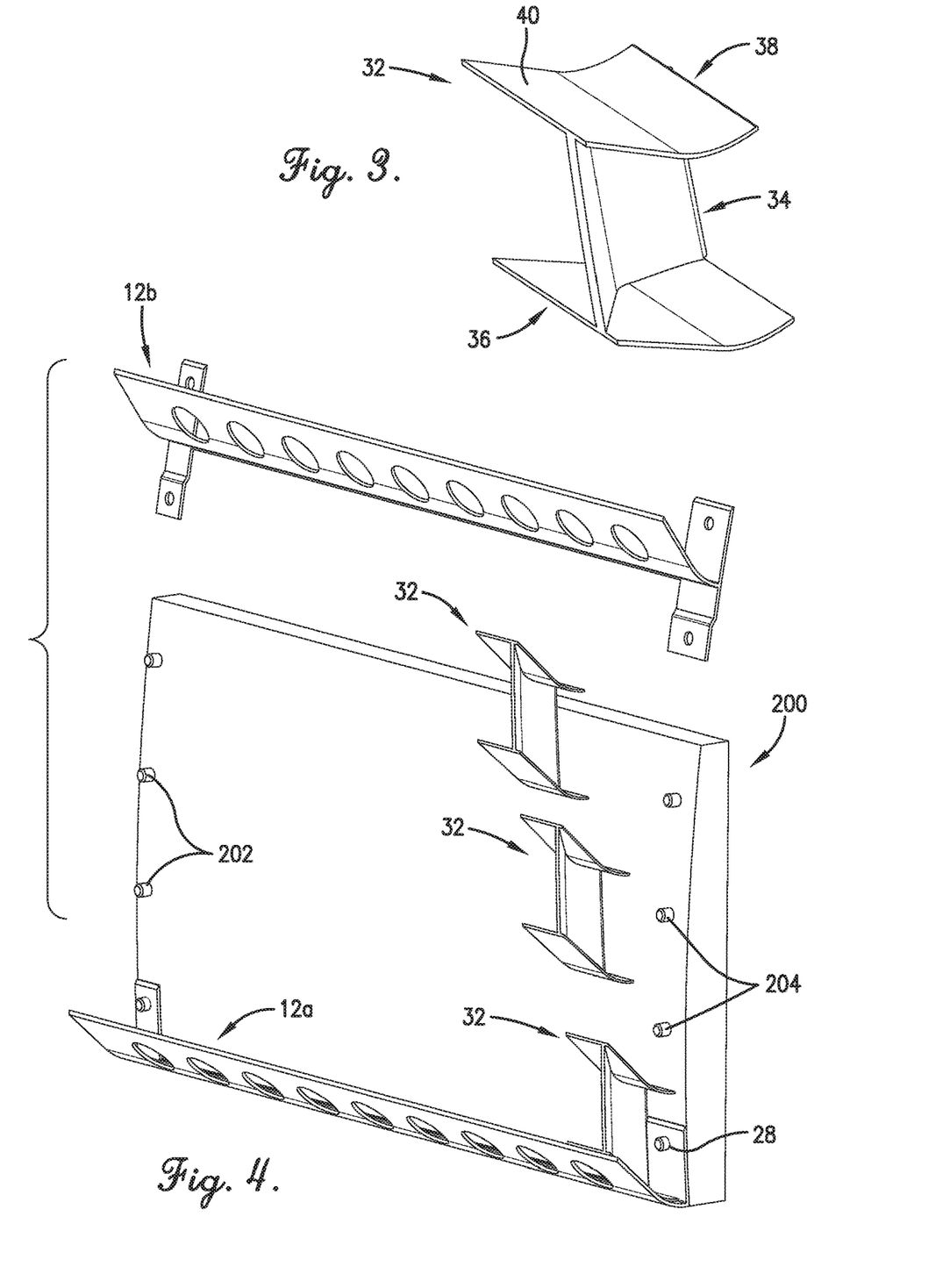
FIG. 3 is a perspective view of a turning vane of the thrust reverser cascade assembly.
FIG. 4 is perspective view of frame sections and turning vanes being assembled on an assembly fixture.
Figure 5:
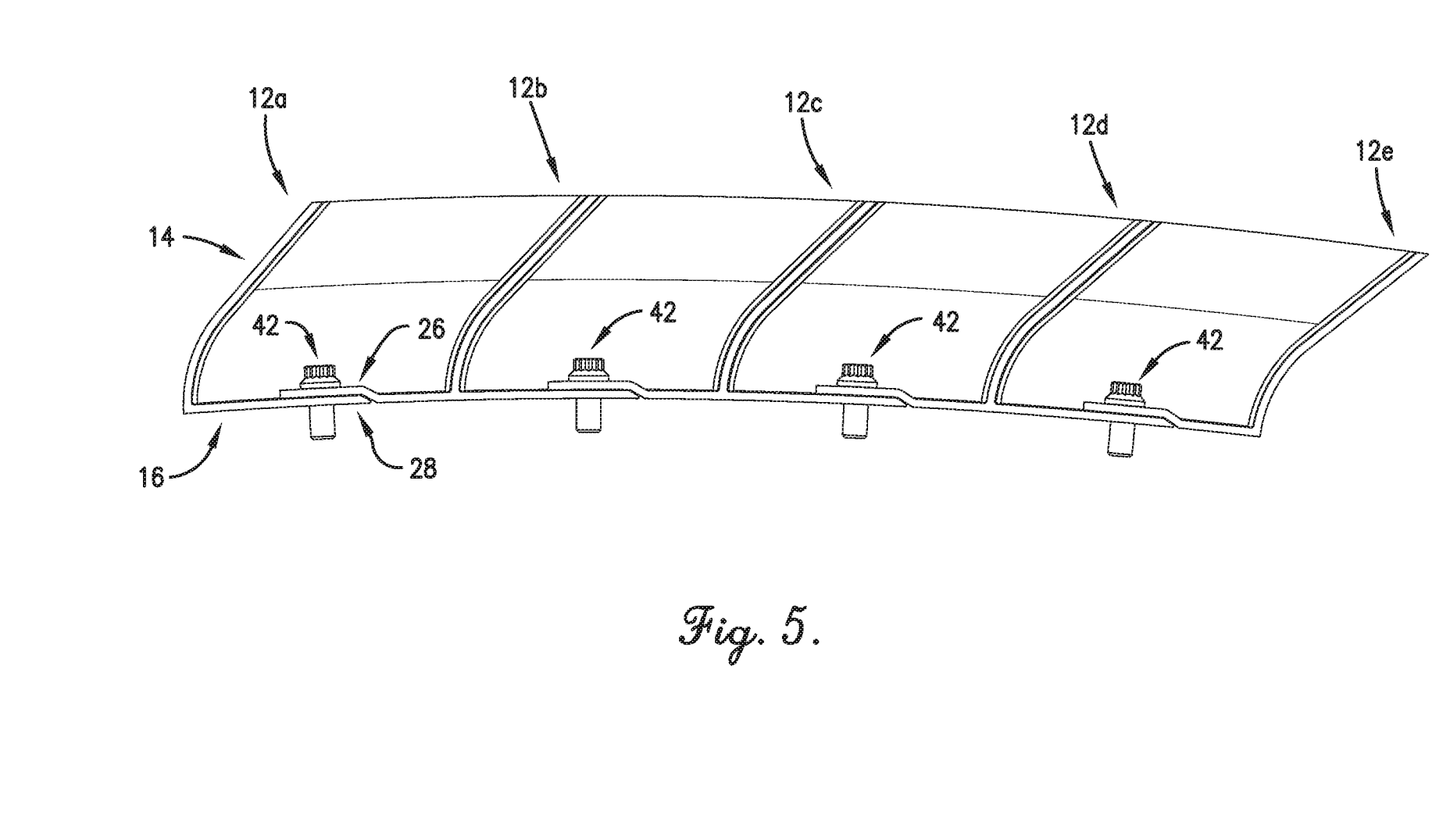
FIG. 5 is a side elevation view of the thrust reverser cascade assembly.

A plurality of turning vanes 32 may also be formed via a batch process such as injection molding, or any other suitable process, as shown in block 106. The turning vanes 32 include a curved or arched thrust guide 34 and opposing first and second vane flanges 36, 38. The vane flanges 36, 38 extend substantially perpendicular to the thrust guide 34 on opposite sides of the thrust guide 34 and each include an outer surface 40 for abutting one of the first and second sides 20, 22 of the elongated stiffeners 14 of adjacent frame sections 12a-e. In some embodiments, the turning vanes 32 may have interlocking vane-to-vane and/or vane-to-frame geometry for aligning the turning vanes 32 in a desired orientation relative to the frame sections 12a-e as described below.

The turning vanes 32 may then be trimmed or modified to a final dimension or shape, as shown in block 108. It will be understood that the frame sections 12a-e and turning vanes 32 may be formed and trimmed simultaneously.

The frame sections 12a-e and turning vanes 32 may then be individually examined via non-destructive inspection (NDI) before being added to the thrust reverser cascade assembly 10, as shown in block 110. For example, the frame sections 12a-e may be interrogated via ultrasonic or eddy current probes.

A bonding agent may then be coated on or applied to one or more of the first and second sides 20, 22 of the elongated stiffeners 14, the flanges 16, 18 of the frame sections 12a-e, and the outer surfaces 40 of the vane flanges 36, 38 of the turning vanes 32, as shown in block 112. This improves bonding between adjacent frame sections 12a-e and between the elongated stiffeners 14 and turning vanes 32.

A first frame section 12a may then be positioned on the assembly fixture 200. More specifically, the alignment geometries 24 of the first frame section 12a may be aligned with a first set of alignment features 202 of the assembly fixture 200, as shown in block 114.

An adhesive, double-sided tape, or similar agent (separate from the bonding agent of block 212) may then be applied to the flanges 16, 18 of the first frame section 12a and/or the outer surfaces 40 of the vane flanges 36, 38 of a first set of turning vanes 32, as shown in block 116. To that end, it may be easier to apply the adhesive to the frame section 12a if film adhesive is used instead of placing adhesive on each vane flange 36, 38. Paste adhesive could be applied to both surfaces. The bonding agent of step 212 helps the adhesive or tape adhere to the flanges 16, 18 of the first frame section 12a and the outer surfaces 40 of the vane flanges 36, 38 of the first set of turning vanes 32.

The first set of turning vanes 32 may then be positioned on the elongated stiffener 14 of the first frame section 12a, as shown in block 118. The adhesive or tape applied to the outer surfaces 40 in step 214 holds the first set of turning vanes 32 in place. The first set of turning vanes 32 may also be aligned in a desired orientation via interlocking vane-to-vane and/or vane-to-frame geometry, welding, or fastening.

A second frame section 12b may then be positioned on the assembly fixture 200 such that the alignment geometries 24 of the second frame section 12b are aligned with a second set of alignment features 204 of the assembly fixture 200 and the flanges 16, 18 of the second frame section 12b overlap or underlap the flanges 16, 18 of the first frame section 12a, as shown in block 120. In this way, the first set of turning vanes 32 are positioned between the elongated stiffeners 14 of the first and second frame sections 12a,b. That is, the elongated stiffener 14 of the second frame section 12b is spaced from the elongated stiffener 14 of the first frame section 12a and the first side 20 of the elongated stiffener 14 of the second frame section 12b abuts outer surfaces 40 of the second vane flanges 38 of the first set of turning vanes 32. Arched geometry of the elongated stiffeners 14 may also trap the turning vanes 32 in place. The adhesive or tape applied to the flanges 16, 18 of the first frame section 12a keep the overlapping flanges of the adjacent frame sections 12a,b abutting each other.

An adhesive, double-sided tape, or similar agent may then be applied to the outer surfaces 40 of the vane flanges 36, 38 of a second set of turning vanes 32 and the flanges 16, 18 of the second frame section 12b, as shown in block 122. The bonding agent of step 112 helps the adhesive or tape adhere to the outer surfaces 40 of the vane flanges 36, 38 of the second set of turning vanes 32.

The second set of turning vanes 32 may then be positioned on the elongated stiffener 14 of the second section 12b, as shown in block 124. The adhesive or tape applied to the outer surfaces 40 in block 122 holds the second set of turning vanes 32 in place. The second set of turning vanes 32 may also be aligned in a desired orientation via interlocking vane-to-vane and/or vane-to-frame geometry, welding, or fastening.

Additional intermediate frame sections 12c-d and sets of turning vanes 32 may then be prepared and added to the thrust reverser cascade assembly 10 as required. The end frame section 12e may be added to the thrust reverser cascade assembly 10 last, as shown in block 126. Note that the flanges 16, 18 of the end frame section 12e only extend towards the previously attached frame section 12d. Thus, a complete thrust reverser cascade assembly 10 includes end frame sections 12a and 12e and a number of intermediate frame sections 12b-d.

Fasteners 42 may then be inserted through the alignment geometries 28 of the frame sections 12a-e so as to secure the frame sections 12a-e together and to attach the thrust reverser cascade assembly 10 to a thrust reverser structure, as shown in block 128.

The above-described thrust reverser cascade assembly fabrication method and other embodiments of the invention provides many advantages. For example, forming each frame section 12a-e separately allows steel tooling to be used since the tooling can be extracted easily from individual frame sections 12a-e and hence tooling with a large difference in CTE is not necessary. Forming each frame section 12a-e and turning vane 32 separately also allows for easier application of a bonding agent between the frame sections and turning vanes, improved post-cure machining, and non-destructive inspection of each component. Material can also be removed from each frame section 12a-e to improve its strength to weight ratio. Moreover, the turning vanes 32 may be inserted into position without being slid into place, which eliminates the problem of paste adhesive being scraped off during installation and allows double-sided tape to be used to hold the turning vanes 32 in place. Other advantages include gravity assisting in maintaining the stability of turning vane during assembly, and fasteners inserted into alignment geometries 28 of overlapping flanges 16, 18 of adjacent frame sections 12a-e secure the adjacent frame sections 12a-e together and secure the thrust reverser cascade assembly 10 to a thrust reverser structure. The thrust reverser cascade assembly 10 can also be extended by adding additional frame sections and additional turning vanes.

Figure 7:
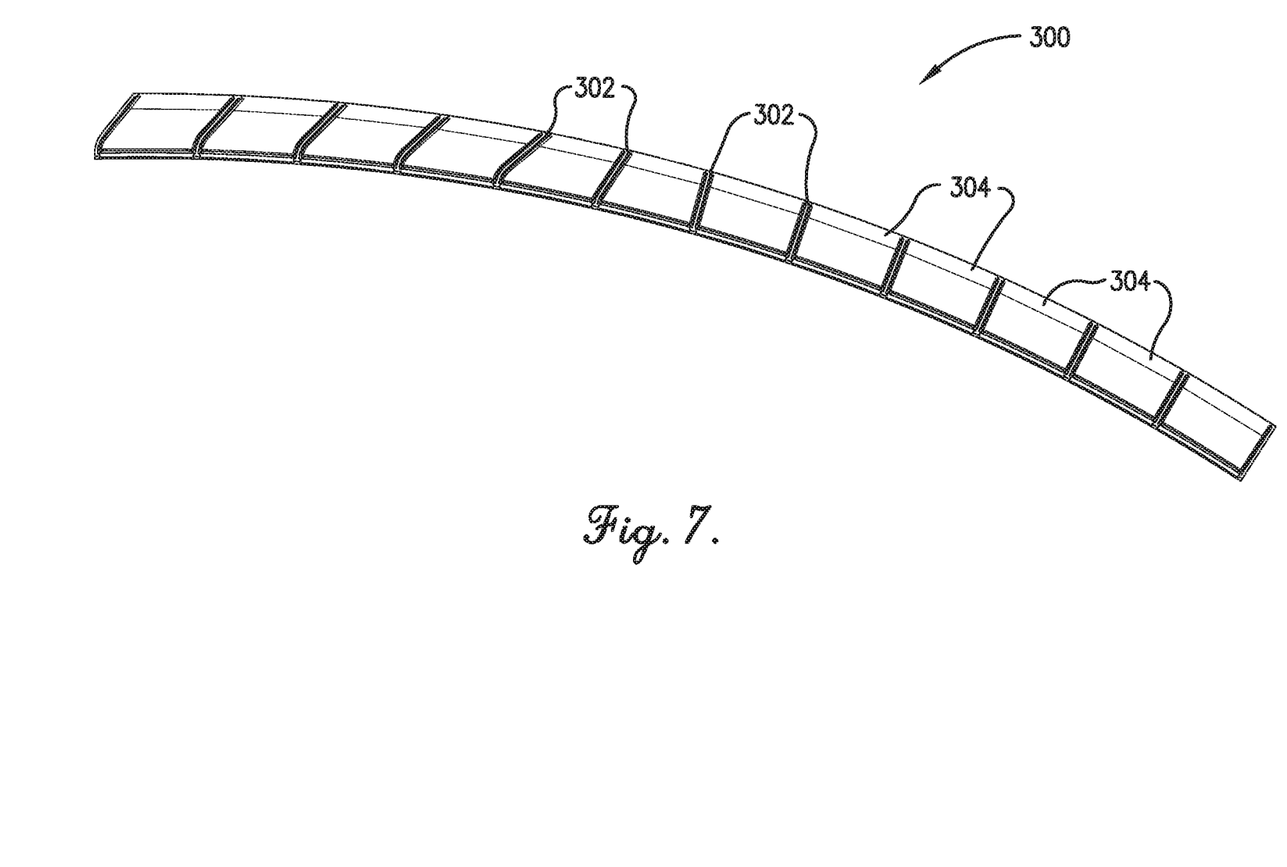
FIG. 7 is a side elevation view of a thrust reverser cascade assembly constructed in accordance with the method of FIG. 6.

Turning to FIG. 7, a thrust reverser cascade assembly 300 constructed via the above method is illustrated. The thrust reverser cascade assembly 300 includes thirteen frame sections 302 and twelve rows of turning vanes 304. However, it will be understood that the thrust reverser cascade assembly 300 can be as wide as desired (i.e., with as many frame sections and turning vanes as needed) without significant tooling or capital costs. The extra width of the thrust reverser cascade assembly 300 (versus a combination of shorter cascade assemblies) allows it to be more resistant to lateral deflections associated with vibration and/or air loads.

Elongated stiffeners of the frame sections 302 and flanges of the turning vanes 304 may have various geometries. For example, the thrust reverser cascade assembly 300 may transition from purely radial frame sections (right side of FIG. 7) to side turning frames sections (left side of FIG. 7). Other heterogeneous configurations are also possible. Thus, cascade assemblies with different or gradually changing configurations can be incorporated into a single cascade assembly. Incorporating frame sections and turning vanes of various geometries into a single cascade assembly eliminates the need for end frame sections of different geometries to be positioned adjacent to each other, which significantly increases the useful air flow area of the thrust reverser.

The thrust reverser cascade assembly 300 also reduces the overall number of frame sections since each assembly needs two end frame sections, which further increases the useful air flow area of the thrust reverser. For example, the thrust reverser cascade assembly 300 eliminates at least two frame sections by replacing three end-to-end cascade assemblies. Four sets of thrust reverser cascade assemblies 300 can thus be combined to eliminate at least eight frame sections. Note that other cascade assemblies adjacent to actuators may remain unchanged.

The length of a cascade assembly is largely determined by the amount of area required to accommodate the necessary amount of air flow through the cascade assembly during reverse thrust; thus, an increase in useful air flow area allows for a reduction in cascade assembly length. This results in a reduction of cascade assembly weight and also reduces weight and cost elsewhere since actuator stroke, slider length, and overall thrust reverser length are influenced by the cascade assembly length.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of fabricating a thrust reverser cascade assembly, the method comprising the steps of:
   positioning a plurality of independent frame sections adjacent to each other, each having a single elongated stiffener and a plurality of flanges extending laterally from the elongated stiffener, some of the frame sections being intermediate frame sections having opposing flanges;
   overlapping the flanges of each frame section with a flange of an adjacent frame section such that elongated stiffeners of adjacent frame sections are laterally spaced from each other and such that the intermediate frame sections are spaced between two adjacent frame sections via the opposing flanges;
   positioning a plurality of turning vanes between the elongated stiffeners of adjacent frame sections;
   securing the turning vanes to the elongated stiffeners of adjacent frame sections; and
   securing the adjacent frame sections to each other via the overlapping flanges.

2. The method of claim 1, further comprising the step of inspecting the plurality of independent frame sections and turning vanes via non-destructive inspection before positioning the plurality of independent frame sections adjacent to each other and before positioning the turning vanes between the elongated stiffeners of the adjacent frame sections.

3. The method of claim 1, wherein the turning vanes include flanges configured to abut the elongated stiffeners of the plurality of independent frame sections and the step of securing the turning vanes to the elongated stiffeners includes applying an adhesive or double-sided tape between the flanges of the turning vanes and the elongated stiffeners.

4. The method of claim 1, wherein the step of securing the adjacent frame sections to each other includes inserting fasteners through aligned fastener holes of the overlapping flanges.

5. The method of claim 1, wherein the step of securing the adjacent frame sections to each other includes applying an adhesive or double-sided tape to at least portions of the overlapping flanges.

6. The method of claim 1, further comprising the step of aligning the turning vanes via interlocking geometry.

7. The method of claim 1, further comprising the step of aligning the turning vanes via welding or fastening.

8. The method of claim 1, further comprising the step of applying a bonding agent to the plurality of independent frame sections and turning vanes for improving bonding therebetween.

9. The method of claim 1, further comprising the step of trimming the plurality of independent frame sections.

10. The method of claim 1, further comprising the step of removing material from the elongated stiffeners of the plurality of independent frame sections for increasing a strength-to-weight ratio of the plurality of independent frame sections.

11. The method of claim 1, wherein the plurality of independent frame sections includes a first end section, a second end section, and a plurality of inner sections, the inner sections being substantially identical to each other, the end sections being different from each other and different from the inner sections.

12. The method of claim 1, wherein the thrust reverser cascade assembly includes at least ten frame sections and at least nine rows of turning vanes.

13. The method of claim 1, further comprising the step of forming the plurality of independent frame sections via pultrusion or extrusion.

14. The method of claim 1, further comprising the step of forming the plurality of independent frame sections on steel tooling.

15. The method of claim 1, wherein the plurality of independent frame sections includes elongated stiffeners having at least two geometries.

16. The method of claim 15, wherein some of the plurality of independent frame sections are radially extending frame sections and some of the plurality of independent frame sections are side turning frame sections.

17. The method of claim 1, wherein the steps of positioning the plurality of independent frame sections and positioning the plurality of turning vanes include the steps of: positioning a first frame section of the plurality of frame sections on an assembly fixture; positioning a first set of turning vanes of the plurality of turning vanes on a first elongated stiffener of the first frame section; after positioning the first frame section, positioning a second frame section of the plurality of frame sections on the assembly fixture adjacent to the first frame section so as to align the second frame section with the first frame section such that a second elongated stiffener of the second frame section is spaced from the first elongated stiffener of the first frame section and adjacent the first set of turning vanes; and positioning a second set of turning vanes of the plurality of turning vanes on the second elongated stiffener of the second frame section; and after positioning the second frame section, positioning additional frame sections of the plurality of independent frame sections on the assembly fixture so as to align the additional frame sections with previously placed frame sections and positioning additional turning vanes of the plurality of turning vanes on previously placed frame sections in alternating fashion.

18. The method of claim 17, wherein the steps of positioning frame sections on the assembly fixture include aligning alignment geometry of the plurality of independent frame sections with alignment geometry of the assembly fixture.

19. The method of claim 17, wherein the steps of positioning turning vanes on elongated stiffeners include aligning the turning vanes with indexing geometry on the assembly fixture.

20. A method of fabricating a thrust reverser cascade assembly, the method comprising the steps of:
  positioning a first frame section on an assembly fixture, the first frame section having a single elongated stiffener and a plurality of flanges extending laterally from the elongated stiffener;
  positioning a first set of turning vanes on the elongated stiffener of the first frame section;
  securing the first set of turning vanes to the elongated stiffener of the first frame section;
  positioning a second frame section on the assembly fixture adjacent to the first frame section, the second frame section having a single elongated stiffener and a plurality of opposing flanges extending laterally from the elongated stiffener so that the second frame section is an intermediate frame section, such that flanges of the first and second frame sections overlap each other so that the elongated stiffener of the second frame section is spaced from the elongated stiffener of the first frame section and adjacent the first set of turning vanes, the second frame section being independent from the first frame section;
  positioning a second set of turning vanes on the elongated stiffener of the second frame section;
  securing the second set of turning vanes to the elongated stiffener of the second frame section;
  positioning additional frame sections on the assembly fixture adjacent to previously placed frame sections, the additional frame sections each having a single elongated stiffener and a plurality of flanges, such that flanges of the additional frame sections and previously placed frame sections overlap each other and such that the second frame section is spaced between two adjacent frame sections via the opposing flanges, the additional frame sections being independent from the first and second frame sections and from each other;
  positioning additional turning vanes on elongated stiffeners of previously placed frame sections;
  securing the additional turning vanes to the previously placed frame sections in alternating fashion; and
  inserting cascade basket fasteners through aligned fastener holes of the overlapping flanges of the adjacent frame sections so as to secure the adjacent frame sections together and secure the thrust reverser cascade assembly to a cascade basket.

* * * * *